United States Patent [19]

Suzuki et al.

[11] Patent Number: 5,139,396

[45] Date of Patent: Aug. 18, 1992

[54] BALL BEARING FOR USE IN VACUUM AND TURBO-MOLECULAR PUMP INCORPORATING SAME

[75] Inventors: Kazuya Suzuki, Osaka; Hirokazu Takii, Nara, both of Japan

[73] Assignee: Koyo Seiko Co., Ltd., Osaka, Japan

[21] Appl. No.: 661,199

[22] Filed: Feb. 27, 1991

[30] Foreign Application Priority Data

Mar. 5, 1990 [JP] Japan ................................ 2-54497

[51] Int. Cl.⁵ ...................... F04B 37/14; F16C 33/61; F04D 19/04
[52] U.S. Cl. ................................ 417/423.4; 384/488; 384/492; 384/907.1; 415/90; 417/423.13
[58] Field of Search ............. 417/423.12, 423.13, 417/423.4; 384/492, 907.1, 488; 415/90

[56] References Cited

U.S. PATENT DOCUMENTS

| | | | |
|---|---|---|---|
| 4,183,592 | 1/1980 | Sudd et al. ......................... | 384/488 |
| 4,332,522 | 1/1982 | Saulgeot ............................ | 415/90 |
| 4,827,168 | 5/1989 | Nakajima .......................... | 384/488 X |
| 4,957,417 | 9/1990 | Tsuboi ............................... | 417/423.13 |
| 4,966,552 | 10/1990 | Gonser ............................. | 384/492 X |
| 5,028,219 | 7/1991 | Schuetz et al. .................. | 384/492 X |

FOREIGN PATENT DOCUMENTS

| | | |
|---|---|---|
| 55-98693 | 7/1980 | Japan . |
| 62-184193 | 11/1987 | Japan . |
| 1-275914 | 11/1989 | Japan . |
| 1-285696 | 11/1989 | Japan . |

*Primary Examiner*—Leonard E. Smith
*Attorney, Agent, or Firm*—Mason, Fenwick & Lawrence

[57] ABSTRACT

A ball ball bearing for use in a vacuum is a sealed full-type ball bearing comprising an inner ring and an outer ring both made of stainless steel, balls made of a ceramic composed primarily of silicon nitride, and stainless steel shield plates. The bearing has enclosed therein a grease of low-volatility composition comprising a diester synthetic oil serving as a base oil, an organic condensation agent and an ethylene tetrafluoride resin additive.

2 Claims, 1 Drawing Sheet

BALL BEARING FOR USE IN VACUUM AND TURBO-MOLECULAR PUMP INCORPORATING SAME

BACKGROUND OF THE INVENTION

The present invention relates to a ball bearing for use in a vacuum and a turbo-molecular pump having the bearing incorporated therein.

Grease-lubricated bearings having a cage are already known as ball bearings for use in turbo-molecular pumps.

Grease-lubricated ball bearings for turbo-molecular pumps are rotated at a high speed, for example, of about 75,000 r.p.m. during use, so that grease is not fully supplied to the pocket portions of the cage and the guide face of the bearing ring opposed to the cage. Further because the bearing is used in a vacuum, the frictional heat generated by the rotation of the bearing is not transferred to the outside effectively but remains in the interior of the bearing. Accordingly, the grease becomes degraded early, or early seizure occurs between the ball and the pocket portion of the cage or between the outer periphery of the cage and the inner peripheral guide face of the outer ring. Consequently, the life of the bearing is limited more greatly in a vacuum than in the atmosphere in view of the allowable temperature and becomes shorter. This leads to the problem of shortening the life of the turbo-molecular pump.

SUMMARY OF THE INVENTION

The main object of the present invention is to provide a ball bearing free of the above problem and having a prolonged life for use in a vacuum and a turbo-molecular pump having the bearing incorporated therein.

The ball bearing of the present invention for use in a vacuum is a sealed full-type ball bearing which comprises an inner ring and an outer ring both made of stainless steel, balls made of a ceramic composed primarily of silicon nitride, and stainless steel shield plates, the bearing having enclosed therein a grease made of a low-volatility composition.

Preferably, the grease comprises a diester synthetic oil serving as a base oil, an organic condensation agent and an ethylene tetrafluoride resin additive.

The turbo-molecular pump of the present invention comprises a multiplicity of stationary blades provided inside a casing and arranged axially thereof, a rotary member supported inside the casing by ball bearings and rotatable by an electric motor, and a multiplicity of rotary blades mounted on the rotary member and facing the respective stationary blades axially of the member. The turbo-molecular pump is characterized in that each of the ball bearings supporting the rotary member is a sealed full-type ball bearing which comprises an inner ring and an outer ring both made of stainless steel, balls made of a ceramic composed primarily of silicon nitride, and stainless steel shield plates, the bearing having enclosed therein a grease comprising a diester synthetic oil serving as a base oil, an organic condensation agent and an ethylene tetrafluoride resin additive.

The bearing of the present invention is a sealed full-type ball bearing having no cage and is therefore free of the problem of seizure of the cage portion which is encountered in the prior art. The absence of the cage gives an increased agitation-free volume inside the bearing for the bearing to enclose an increased amount of grease therein. The absence of the cage permits an increased quantity of grease to adhere to the inner periphery of the outer ring, so that the grease can be supplied to the spaces between the bearing ring and the balls more effectively. The present bearing is free of the slippage that would occur in conventional bearings between the cage and the balls and between the cage and the inner peripheral guide face of the outer ring. This reduces the torque, diminishes the heat evolution of the bearing itself and heat evolution of the electric motor and therefore decreases the amount of evaporation of the grease. Moreover, the grease, which is made of a low-volatile composition, evaporates only in a very small amount.

Since the balls are made of a ceramic, no seizure occurs between the balls. The ceramic balls are lightweight, therefore serve to diminish gyroscopic slide and reduces the friction torque. This results in the same advantages as above, i.e., diminished heat evolution of the bearing itself and the motor and inhibited evaporation of the grease to give a longer life to the grease. Furthermore, the bearing rings and the shield plates are made of corrosion-resistant stainless steel, and the ceramic balls are also resistant to corrosion. This feature eliminates the problem heretofore encountered with steel materials in the case where apparatus such as turbo-molecular pumps are used in a vacuum, i.e., the contamination of the interior of the apparatus due to the evaporation of corrosion inhibitor oil.

As described above, the present invention diminishes the evaporation of grease enclosed in the ball bearing, assures satisfactory lubrication over a prolonged period of time, reduces the likelihood of seizure and therefore gives an improved life to the ball bearing, consequently improving the life of the turbo-molecular pump.

DESCRIPTION OF THE PREFERRED EMBODIMENTS

The present invention will be described below in greater detail with reference to the accompanying drawings.

Figure 2:
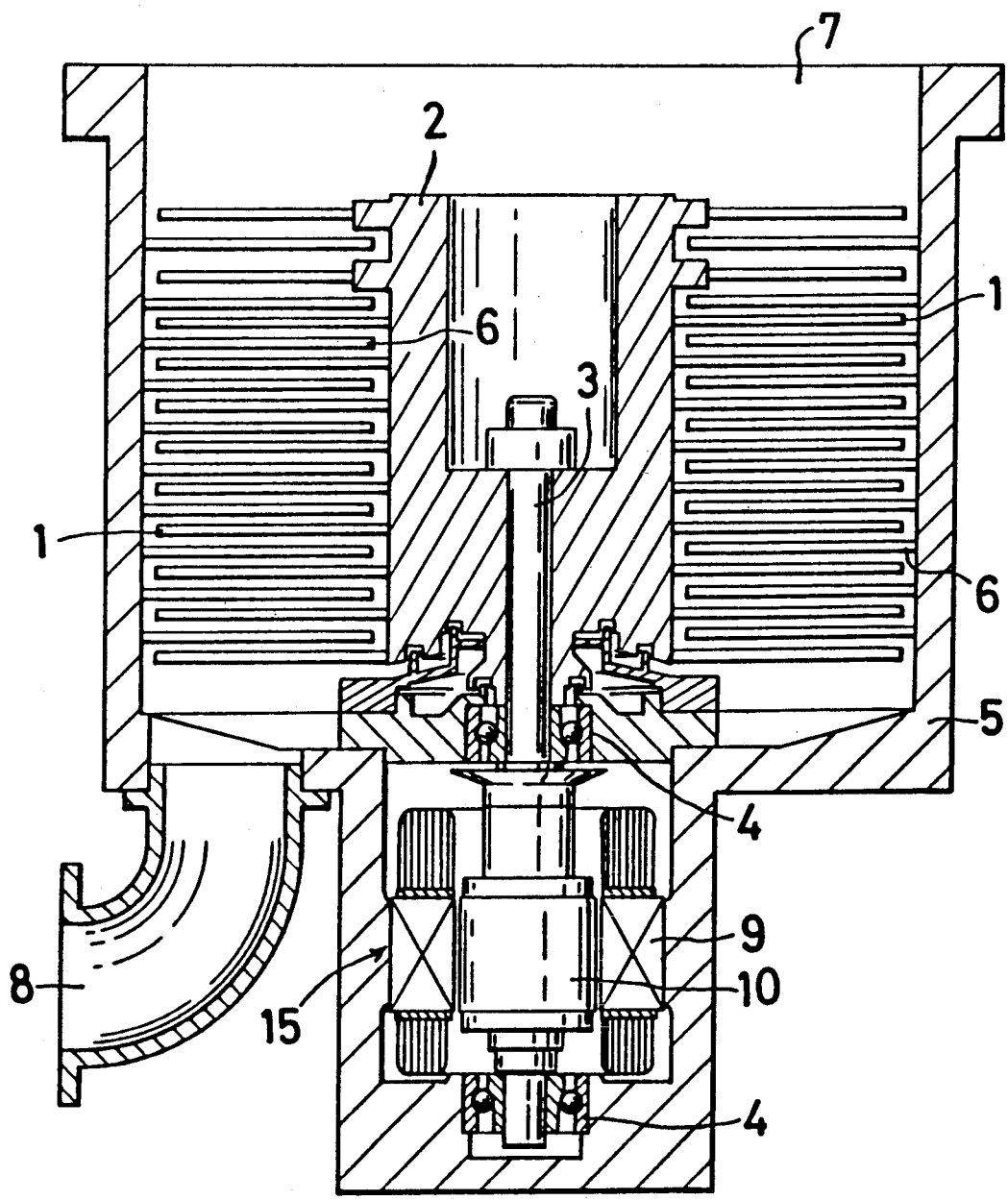
FIG. 2 is a fragmentary view in vertical section schematically showing an embodiment of turbo-molecular pump having the ball bearing incorporated therein.

FIG. 2 schematically shows the main portion of a turbo-molecular pump.

With reference to FIG. 2, a rotary member 2 is provided on its upper portion with a multiplicity of rotary blades 1 arranged axially thereof. The rotary member 2 has a shaft 3 rotatably supported inside a casing 5 by two ball bearings 4. The casing 1 is fixedly provided inside the upper portion thereof with a multiplicity of stationary blades 6 concentric with the rotary member 2 and the rotary blades 1 and axially facing the respective rotary blades 1. The casing 5 has an air intake opening 7 at its upper end and an air discharge opening 8 at its lower portion. The lower portion of the casing 5 is internally provided with the stator 9, for example, of a high-frequency electric motor 15, and a motor rotor 10 mated therewith is mounted on the lower portion of the shaft 3. Above and below the motor rotor 10, the shaft 3 is supported by the bearings 4.

The turbo-molecular pump described above operates in the following manner. A vacuum system comprises a chamber (not shown) communicating with the air intake opening 7 of the casing 5, the casing 5 and the air discharge opening 8 communicating with a roughing rotary pump (not shown). First, the roughing rotary pump is operated to maintain the entire vacuum system in a low vacuum. The motor 15 is then started to rotate the shaft 3 and produce an interaction between the rotary blades 1 and the stationary blades 6, whereby gas molecules in the chamber and the turbo-molecular pump are continuously discharged therefrom through the opening 8 to realize a high vacuum within the chamber and the pump.

Figure 1:
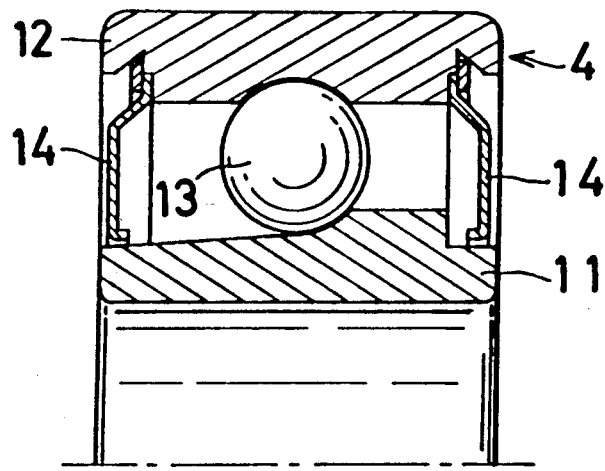
FIG. 1 is a fragmentary view in vertical section showing a ball bearing embodying the invention for use in a vacuum.

FIG. 1 shows an example of bearing 4.

With reference to FIG. 1, the bearing 4 is an angular contact full-type ball bearing which comprises a counterbored inner ring 11, an outer ring 12 not counterbored, balls 13 and shield plates 14 attached to the respective ends of the outer ring 12.

The inner ring 11, the outer ring 12 and the shield plates 14 are made of stainless steel. The balls 13 are made of a ceramic composed primarily of silicon nitride. Enclosed in the space between the inner ring 11 and the outer ring 12 is a grease made of a low-volatility composition (vapor pressure: $7.5 \times 10^{-6}$ torr at 20° C.). Preferably, the grease comprises a diester synthetic oil serving as a base oil and more excellent in high-temperature high-speed lubricity than conventional fluorine-containing base oils, 1% of organic condensation agent such as Bentonite, and 29% of ethylene tetrafluoride resin additive having good stability and high lubricity at high temperatures.

To substantiate the advantage of the present invention, a full-type ball bearing (example of the invention) was fabricated from an inner ring and an outer ring both made of JIS SUJ2 and ceramic balls, with the above grease of low-volatility composition enclosed in the bearing. The bearing was subjected to a life test under the following conditions.

| Number of revolutions | 75,000 r.p.m. |
| --- | --- |
| (inner ring): | |
| Degree of vacuum: | $10^{-1}$ to $10^{-2}$ torr |
| Temperature: | Atmosphere: room temperature Saturation temperature during rotation (inner ring): 80° C. |
| Load: | Thrust preload: 1.5 kgf |

The test revealed that the full-type bearing of the example had a life of 7,500 to 10,000 hours, which was much longer than the life (2,000 to 5,000 hours) of a bearing wherein the inner ring, outer ring, balls and grease were made of the same material as those of the example and which included a cage of bakelite, and the life (2,000 to 4,000 hours) of a conventional full-type bearing wherein the inner ring, outer ring and balls were made of the same material as those of the example and which had enclosed therein a grease comprising a fluorine-containing base oil.

What is claimed is:

1. A sealed full-type ball bearing for use in a vacuum comprising an inner ring and an outer ring both made of stainless steel, balls mad of a ceramic composed primarily of silicon nitride, and stainless steel shield plates, the bearing having enclosed therein a grease comprising a diester synthetic oil serving as a base oil, and organic condensation agent and an ethylene tetrafluoride resin additive.

2. A turbo-molecular pump comprising a multiplicity of stationary blades provided inside a casing and arranged axially thereof, a rotary member supported inside the casing by ball bearings and rotatable by an electric motor, and a multiplicity of rotary blades mounted on the rotary member and facing the respective stationary blades axially of the member, the turbo-molecular pump being characterized in that each of the ball bearings supporting the rotary member is a sealed full-type ball bearing comprising an inner ring and an outer ring both made of stainless steel, balls made of a ceramic composed primarily of silicon nitride, and stainless steel shield plates, the bearing having enclosed therein a grease comprising a diester synthetic oil serving as a base oil, an organic condensation agent and an ethylene tetrafluoride resin additive.

* * * * *